United States Patent
Iwasaki et al.

(10) Patent No.: US 11,130,688 B2
(45) Date of Patent: Sep. 28, 2021

(54) METHOD FOR CONTROLLING PH BY ELECTRICAL CONDUCTIVITY

(71) Applicant: KURITA WATER INDUSTRIES LTD., Tokyo (JP)

(72) Inventors: Mamoru Iwasaki, Tokyo (JP); Nozomu Ikuno, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 169 days.

(21) Appl. No.: 16/476,731

(22) PCT Filed: Sep. 15, 2017

(86) PCT No.: PCT/JP2017/033543
§ 371 (c)(1),
(2) Date: Jul. 9, 2019

(87) PCT Pub. No.: WO2018/138957
PCT Pub. Date: Aug. 2, 2018

(65) Prior Publication Data
US 2019/0359508 A1    Nov. 28, 2019

(30) Foreign Application Priority Data
Jan. 30, 2017    (JP) .................... JP2017-014354

(51) Int. Cl.
*C02F 1/66* (2006.01)
*B01D 19/00* (2006.01)
(Continued)

(52) U.S. Cl.
CPC ............ *C02F 1/66* (2013.01); *B01D 19/0031* (2013.01); *B01D 19/0068* (2013.01);
(Continued)

(58) Field of Classification Search
None
See application file for complete search history.

(56) References Cited

U.S. PATENT DOCUMENTS 6,258,278 B1 * 7/2001 Tonelli ................. B01D 61/022
                                                       210/638

FOREIGN PATENT DOCUMENTS

JP    S63-054438 B2    10/1988
JP    H05-269464 A     10/1993
(Continued)

OTHER PUBLICATIONS

PCT/ISA/210, "International Search Report for International Application No. PCT/JP2017/033543," dated Oct. 17, 2017.

(Continued)

*Primary Examiner* — Richard C Gurtowski
(74) *Attorney, Agent, or Firm* — Manabu Kanesaka

(57) ABSTRACT

Provided is a method for controlling a pH to a neutral range (pH 6 to 8) by adding an alkali or an acid to decarbonated water, including controlling the amount of the alkali or the acid added using an electrical conductivity meter. The decarbonated water is, for example, water obtained by decarbonating industrial water or groundwater so that the concentration of carbonic acid is 10 ppm or less. The method may further have a step of producing pure water by RO treatment of the decarbonated water with a pH adjusted to 6 to 8 by the pH control.

4 Claims, 2 Drawing Sheets

(51) Int. Cl.
    *B01D 61/02*     (2006.01)
    *B01D 61/04*     (2006.01)
    *B01D 61/12*     (2006.01)
    *C02F 1/00*     (2006.01)
    *C02F 1/20*     (2006.01)
    *C02F 1/44*     (2006.01)
    *C02F 101/10*     (2006.01)
    *C02F 103/06*     (2006.01)

(52) U.S. Cl.
    CPC .......... *B01D 61/025* (2013.01); *B01D 61/04* (2013.01); *B01D 61/12* (2013.01); *C02F 1/008* (2013.01); *C02F 1/20* (2013.01); *C02F 1/441* (2013.01); *B01D 2311/04* (2013.01); *B01D 2311/18* (2013.01); *B01D 2311/2653* (2013.01); *C02F 2101/10* (2013.01); *C02F 2103/06* (2013.01); *C02F 2209/05* (2013.01); *C02F 2209/06* (2013.01)

(56) References Cited

FOREIGN PATENT DOCUMENTS

| | | |
|---|---|---|
| JP | H09-057261 A | 3/1997 |
| JP | H09-314129 A | 12/1997 |
| JP | H10-202259 A | 8/1998 |
| JP | 2002-349804 A | 12/2002 |
| JP | 2004-167423 A | 6/2004 |
| JP | 2005-177564 A | 7/2005 |
| JP | 2007-268352 A | 10/2007 |
| JP | 2007-268397 A | 10/2007 |
| JP | 4983069 B2 | 7/2012 |

OTHER PUBLICATIONS

Japan Patent Office, "Office Action for Japanese Patent Application No. 2017-014354," dated Oct. 10, 2017.

\* cited by examiner

METHOD FOR CONTROLLING PH BY ELECTRICAL CONDUCTIVITY

TECHNICAL FIELD

The present invention relates to a method for adjusting the pH of decarbonated water to neutral using an electrical conductivity meter in the production process of pure water having a deaeration membrane device and a RO (Reverse Osmosis) membrane device.

BACKGROUND ART

Common examples of the process of obtaining pure water using RO include a process in which RO membranes are provided in two stages, as follows.
Filtration→First RO membrane→MD→Second RO membrane The reason why the membrane degasifier (MD) for decarbonation is disposed between the two-stage RO membranes is that leakage of SS and Al used as a flocculant cannot be completely prevented in a filtration device composed of a packed bed of a filter medium. Since a hydrophobic membrane is used as a membrane degasifier, fouling occurs due to the influence of fine particles (SS: Suspended Solids) and Al leaking from a filter. Therefore, the first RO membrane is provided before MD, so as to remove hardness components together with SS and Al. Thereafter, the pH is reduced to about 5 using sulfuric acid, followed by decarbonation using the MD, to prevent the fouling of the MD. After the removal of carbonic acid using the MD, an alkali is added to adjust the pH to 6 to 8, and water is passed through the second RO membrane.

However, in this system, the acid added for degassing and the alkali used for adjusting the pH after degassing are removed by the second RD membrane, and therefore it is difficult to obtain a water quality of 5 MΩ·cm or more.

In order to obtain a water quality of 5 MΩ·cm or more using RO membranes, an electrolyte containing carbonic acid and hardness components that are originally contained in raw water needs to be removed by two-stage RO membranes. Accordingly, the following process is required for the removal.
Aggregation→Decontaminating membrane→MD→First RD membrane→Second RD membrane SS and Al are completely removed using the decontaminating membrane, thereby enabling the membrane degasifier (MD) to be disposed before the two-stage RO membranes. Further, such a configuration enables the electrolyte containing an acid added before degassing and an alkali used for neutralization after degassing to be removed by the two-stage RO membranes and thus enables the water quality to be improved.

Further, in order to ensure a water quality of 5 MΩ·cm or more, both the first RO membrane and the second RO membrane need to exhibit high electrolyte removal rate. For that purpose, it is important to use the RO membranes in a neutral range (pH 6 to 8) in which the RO membranes exert the highest blocking rate. Therefore, it is necessary to stably adjust the pH of water having no pH buffering action after degassing to 6 to 8.

Generally, in the case of adjusting the pH, a glass electrode pH meter is used. Since the pH meter uses a glass diffusion electrode, the time response is poor. When carbonic acid is contained in the water to be measured as in industrial water, changes in pH following the addition of an acid or an alkali are gradual due to the pH buffering action of carbonic acid, as in an example shown in FIG. 2. (FIG. 2 shows an example of changes in pH in the case of adding sulfuric acid to industrial water.) Therefore, even if a pH meter is used, the controllability is high.

FIG. 3 shows an example of a neutralization curve in the case of controlling the pH to around neutral using an alkali after decarbonation of industrial water. (FIG. 3 shows an example of changes in pH in the case of adding sodium hydroxide (NaOH) after adding sulfuric acid to industrial water to adjust the pH to 5.0 and thereafter degassing inorganic carbon (IC) to 2.5 mg·C/L using a membrane degassing device.) In this case, the buffering action by carbonic acid has decreased considerably, and therefore the pH significantly changes by adding a slight amount of alkali, as shown in FIG. 3.

As shown in FIG. 2, the amount of sulfuric acid necessary for decreasing the pH from 7.4 to 5.0 is about 60 mg-$H_2SO_4$ (equivalent amount of $1.22 \times 10^{-3}$) per liter, in the case of industrial water before decarbonation. In contrast, the amount of NaOH necessary for adjusting degassed water (pH 5.85) in FIG. 3 to pH 7 is about 5 mg-NaOH/L (equivalent amount of $0.125 \times 10^{-3}$) per liter, which is exceptionally small. In this way, water after decarbonation has no buffering action by carbonic acid and therefore has a very high rate of change in pH due to addition of an alkali. Accordingly, in the case of decarbonated water, it is very difficult to adjust the pH to 6 to 8, which is a target range, using a glass diffusion electrode pH meter with poor time response.

JP 4983069 B and a conventional art thereof, JP S63-054438 B, disclose controlling the amount of alkaline chemicals such as hydrazine and neutralizing amine added to boiler feed water using an electrical conductivity by determining a proportional logarithmic relationship between the pH and the electrical conductivity. However, in a high range of pH (8.5 or more), the pH and the electrical conductivity are not necessarily in a proportional relationship, and there are deviations. Therefore, there has been no idea of using changes in electrical conductivity instead of changes in pH, in treatment with high pH sensitivity such as RD.

CITATION LIST

Patent Literature

PTL 1: JP 4983069 B
PTL 2: JP S63-054438 B

SUMMARY OF INVENTION

Technical Problem

It is an object of the present invention to provide a method for controlling the amount of an alkali or an acid added to adjust the pH of decarbonated water having a low pH buffering action to neutral, the method enabling controlling the amount added rapidly following changes in pH of the decarbonated water.

Solution to Problem

In the present invention, the method for controlling a pH to a neutral range (for example, a pH of 6 to 8, preferably 6 to 7) by adding an alkali or an acid to decarbonated water includes controlling the amount of the alkali or the acid added using an electrical conductivity meter.

As the decarbonated water, water obtained by decarbonating industrial water or groundwater so that the concentration of carbonic acid is 10 ppm or less is suitable.

According to one aspect of the present invention, the method further includes a step of producing pure water by RD treatment of the decarbonated water with a pH adjusted to 6 to 8 by the pH control.

According to one aspect of the present invention, the method further includes: a step of measuring the pH and electrical conductivity $EC_1$ of the decarbonated water; a step of calculating electrical conductivity $EC_2$ of the water after the addition of the alkali or the acid according to the following formula; and a step of adding the alkali or the acid so that the electrical conductivity after the addition of the alkali or the acid is the calculated $EC_2$.

Electrical conductivity $EC_2$=Electrical conductivity $EC_1$+($\Delta EC/\Delta pH$) [mS·m]×(Target pH–pH of decarbonated water)

In this case, it is preferable that $\Delta EC/\Delta pH$ of the decarbonated water be experimentally determined in advance.

Advantageous Effects of Invention

An electrical conductivity meter measures an electrical resistance between electrodes separated at a predetermined distance and therefore has excellent responsiveness. The electrical conductivity of an aqueous solution is determined depending on the type and concentration of the electrolyte dissolved therein. Table 1 shows the limiting molar electrical conductivities of various ions.

TABLE 1

| Ion | Molar electrical conductivity*1 $10^{-4}$ Sm$^2$/mol |
|---|---|
| $H^+$ | 349.82 |
| $Na^+$ | 50.11 |
| $K^+$ | 73.5 |
| $Ca^{2+}$ | 119 |
| $Mg^{2+}$ | 106.12 |
| $OH^-$ | 198.6 |
| $Cl^-$ | 76.35 |
| $SO_4^{2-}$ | 160 |
| $NO_3^-$ | 71.4 |
| $HCO_3^-$*2 | (50) |

In the Chemical Handbook (Basics), the values are expressed as [S·m$^2$/eq] per charge equivalent, but the values are expressed per mole of ions in Table 1. Further, for convenience of description, $HCO_3^-$ is expressed as 50×10$^{-4}$ [S·m$^2$/mol]. This is because divalent ions are expressed as 100 to 160 [S·m$^2$/mol], and monovalent ions are expressed as 50 to 80 [S·m$^2$/mol], except for $H^+$ and $OH^-$.

The electrical conductivity EC of an aqueous solution containing these ions can be represented by formula (1) below.

$$EC[mS/m] = \sum_i e_i \cdot C_i \quad (1)$$

$C_{Ci}$: Molar concentration of component i [mol/m$^3$]
$e_i$: Molar electrical conductivity of component i [mS·m$^2$/mol]

As shown in Table 1, the molar electrical conductivities of $H^+$ and $OH^-$ that directly relate to the pH are specifically high as compared with other ions. Accordingly, when the pH changes, the electrical conductivity also changes. Since the responsiveness of an electrical conductivity meter is remarkably fast as compared with that of a pH meter, the amount of alkali or acid added can be controlled rapidly following changes in pH of decarbonated water according to the present invention.

DESCRIPTION OF EMBODIMENTS

Figure 1:
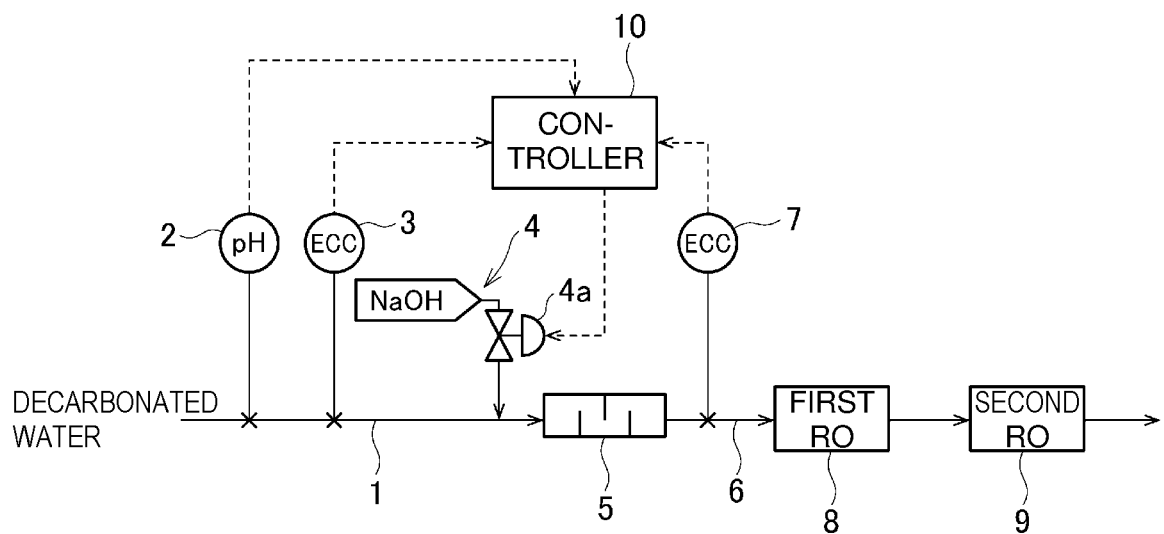
FIG. 1 is a block diagram illustrating the present invention.
Figure 2:
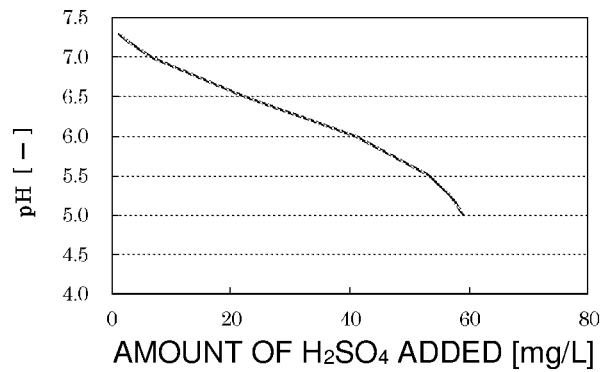
FIG. 2 is a graph showing changes in pH.
Figure 3:
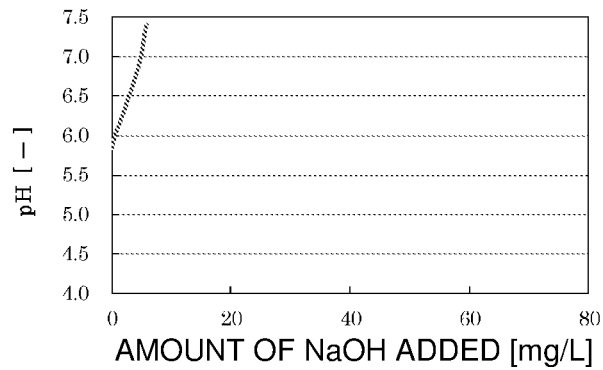
FIG. 3 is a graph showing a neutralization curve.

FIG. 1 is a block diagram illustrating an example of a method for controlling a pH of the present invention. A pipe 1 configured to introduce decarbonated water to a static mixer 5 is provided with a pH meter 2, a first electrical conductivity meter 3, and an alkali (NaOH aqueous solution in this embodiment) adding device 4. The alkali adding device 4 includes a tank, a chemical injection pump, an addition amount control valve 4a, and the like. The concentration of carbonic acid in the decarbonated water is preferably 10 ppm or less, more preferably 8 ppm or less, particularly preferably 5 ppm or less, in view of the accuracy of pH control by the buffering action and the electrical conductivity. As a decarbonation device, a membrane degasifier, a decarbonator, an aerator, or the like can be used, but a membrane degasifier is preferable.

Water after being mixed with an alkali in the static mixer 5 is supplied to a first RO (Reverse Osmosis) device 8 via a pipe 6 and water permeated through the first RO device is passed through a second RO device 9. The pipe 6 is provided with a second electrical conductivity meter 7.

The values detected by the pH meter 2 and the first and second electrical conductivity meters 3 and 7 are input into a controller 10, and the degree of opening of the valve 4a is controlled based on the calculation results, to control the amount of alkali added.

The static mixer 5 is used in FIG. 1, but various mixers such as a pH adjustment tank using a stirrer can be used.

In the controller 10, an electrical conductivity $EC_2$ as a target is calculated by substitution of an electrical conductivity $EC_1$ detected by the first electrical conductivity meter 3, the pH of decarbonated water, and a pH (an appropriate time average) as a target into the following formula, to control the amount of NaOH added using the valve 4a so that the value detected by the second electrical conductivity meter 7 is equal to the target electrical conductivity $EC_2$.

Electrical conductivity $EC_2$[mS/m]=Electrical conductivity $EC_1$[mS/m]+($\Delta EC/\Delta pH$) [mS/m]×(Target pH–pH of decarbonated water) (2)

wherein ($\Delta EC/\Delta pH$) is a ratio of an electrical conductivity relative to pH.

The method for calculating $\Delta EC/\Delta pH$ [mS/m] in formula (2) will be described below. Specifically, an appropriate value is to be updated based on the processing results on site.

The method for controlling a pH of the present invention that uses an electrical conductivity meter with high time response can enhance the control responsiveness in adjusting the pH of decarbonated water (to a pH of preferably 6 to 8, particularly preferably 6 to 7), which is difficult to control because the pH buffering action is considerably reduced due to decarbonation, and thus the pH sharply changes due to addition of alkali. In the range of pH 6 to 8, the (proportional) correlation between the pH and the electrical conductivity is high, and the correlation is further higher in the range of pH 6 to 7. The present invention is suitable for neutralization of acidic decarbonated water to a pH of 6 to 8, particularly, a pH of 6 to 7, by adding an alkali.

When the decarbonation membrane has low decarbonation rate so that the electrical conductivity of treated water in the second RO device 9 cannot satisfy the target electrical conductivity, the same pH adjustment device (including the first and second electrical conductivity meters 3 and 7, the alkali adding device 4, a mixer such as the static mixer 5, and the controller 10) may be provided between the first RO device 8 and the second RO device 9.

EXAMPLES

Experimental Example 1

Table 3 shows the properties of water decarbonated (residual IC=2.5 mg-C/L) using a membrane degassing device after sulfuric acid was added to each of industrial waters 1 to 4 having the properties shown in Table 2 to adjust the pH to 5.

TABLE 2

| Item | Unit | Industrial water (1) | Industrial water (2) | Industrial water (3) | Industrial water (4) |
|---|---|---|---|---|---|
| pH | — | 7.4 | 7.01 | 7.6 | 7.42 |
| Electrical conductivity | mS/m | 34.9 | 30.9 | 30.5 | 37.1 |
| Na | mg/L | 26.2 | 8.69 | 11.83 | 22.9 |
| K | mg/L | 5.65 | 4.09 | 4 | 3.8 |
| Ca | mg/L | 17.9 | 28.6 | 27.2 | 30.5 |
| Mg | mg/L | 8.77 | 6.98 | 7.5 | 5.6 |
| Cl | mg/L | 40.3 | 20.31 | 16.16 | 18.4 |
| $SO_4$ | mg/L | 22.3 | 42.1 | 25.3 | 48.7 |
| $NO_3$ | mg/L | 2.8 | 4.6 | 1.3 | 2.1 |
| IC | mg-C/L | 16.38 | 14.05 | 20.08 | 19.63 |

TABLE 3

| Item | Unit | Decarbonated water (1) | Decarbonated water (2) | Decarbonated water (3) | Decarbonated water (4) |
|---|---|---|---|---|---|
| pH | — | 5.85 | 5.75 | 5.98 | 5.97 |
| Electrical conductivity | mS/m | 28.6 | 24.8 | 25.1 | 29.6 |
| Na | mg/L | 26.2 | 8.69 | 11.8 | 22.9 |
| K | mg/L | 5.65 | 4.09 | 4.00 | 3.80 |
| Ca | mg/L | 17.9 | 28.6 | 27.2 | 30.5 |
| Mg | mg/L | 8.77 | 6.98 | 7.5 | 5.6 |
| Cl | mg/L | 40.3 | 20.3 | 16.2 | 18.4 |
| $SO_4$ | mg/L | 80.2 | 86.3 | 98.6 | 118.3 |
| $NO_3$ | mg/L | 2.8 | 4.6 | 1.3 | 2.1 |
| IC | mg-C/L | 2.50 | 2.50 | 2.50 | 2.50 |

Table 4 shows the water quality after NaOH was added to the decarbonated waters 1 to 4 to adjust the pH to 7.

TABLE 4

| Item | Unit | Adjustment to pH 7 after decarbonation (1) | Adjustment to pH 7 after decarbonation (2) | Adjustment to pH 7 after decarbonation (3) | Adjustment to pH 7 after decarbonation (4) |
|---|---|---|---|---|---|
| pH | — | 7.00 | 7.00 | 7.00 | 7.00 |
| Electrical conductivity | mS/m | 29.77 | 26.07 | 26.16 | 30.66 |
| Na | mg/L | 29.0 | 11.7 | 14.3 | 25.5 |
| K | mg/L | 5.65 | 4.09 | 4 | 3.8 |
| Ca | mg/L | 17.9 | 28.6 | 27.2 | 30.46 |
| Mg | mg/L | 8.77 | 6.98 | 7.5 | 5.6 |
| Cl | mg/L | 40.3 | 20.3 | 16.2 | 18.4 |
| $SO_4$ | mg/L | 80.2 | 86.3 | 98.6 | 118.3 |
| $NO_3$ | mg/L | 2.8 | 4.6 | 1.3 | 2.1 |
| IC | mg-C/L | 2.50 | 2.50 | 2.50 | 2.50 |
| NaOH | mg-L | 4.882 | 5.213 | 4.356 | 4.420 |

As shown in Table 4, the electrical conductivity after decarbonation and adjustment to pH 7 varied depending on the quality of raw water. FIG. 4 shows changes in electrical conductivity corresponding to the amount of NaOH added, in the case of adding NaOH to water after decarbonation (Table 3). Sample waters 1 to 4 in FIG. 4 are respectively the decarbonated waters 1 to 4 in Table 3.

As shown in FIG. 4, in the case of adding NaOH to adjust the pH of sample water (decarbonated water) to 7, the pH and the electrical conductivity increased in the same manner. Further, it is understood that the electrical conductivity increased linearly at a constant rate in each case.

Figure 4A:
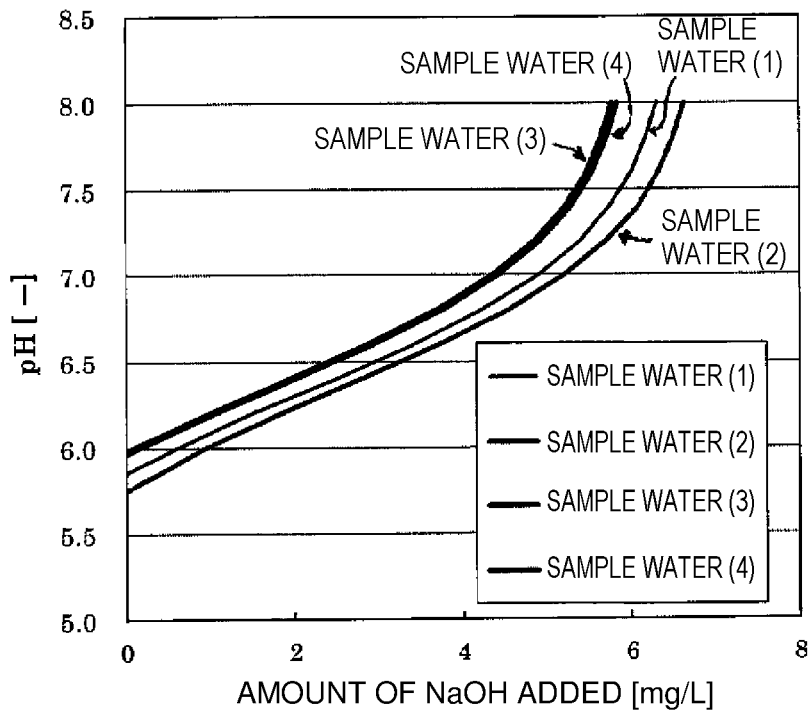
FIGS. 4(A) and 4(B) are graphs illustrating Examples.
Figure 4B:
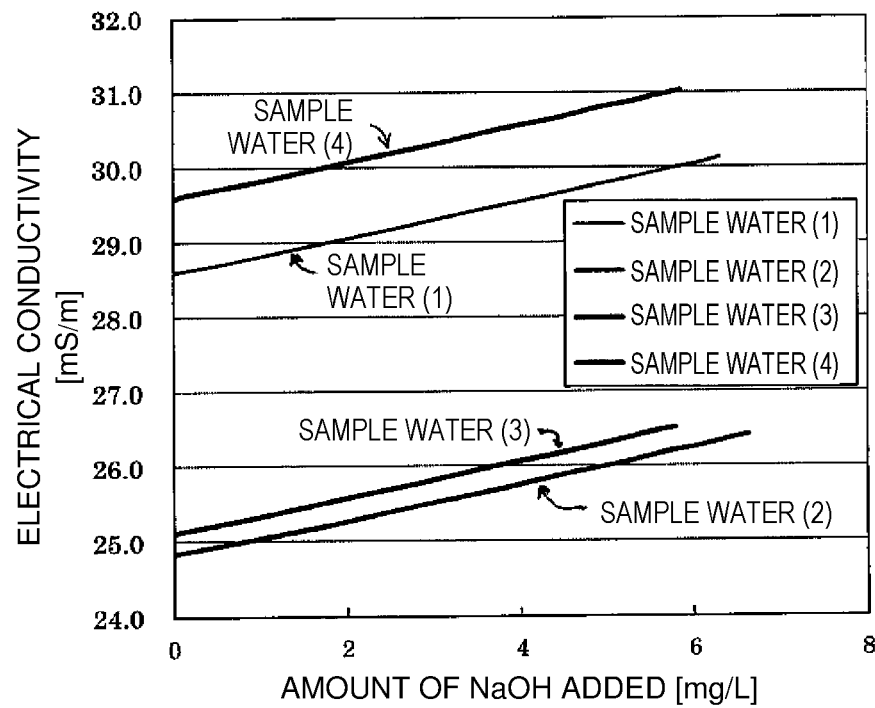

From the slopes of the graphs of FIG. 4(A) by plotting the values of pH on the horizontal axis and FIG. 4(B) by plotting the values of electrical conductivity on the vertical axis, $\Delta EC/\Delta pH$ is determined.

The rate of change in electrical conductivity ($\Delta EC/\Delta pH$) with respect to changes in pH is as shown in Table 5.

TABLE 5

| Target water | Sample water (1) | Sample water (2) | Sample water (3) | Sample water (4) |
|---|---|---|---|---|
| Rate of change in electrical conductivity due to addition of NaOH ($\Delta EC/\Delta pH$) [mS/m] | 0.894 | 0.881 | 0.893 | 0.897 |

The coefficient, 0.89, in calculation formula (2) of the target electrical conductivity for adjusting the pH of decarbonated water to 7 (target pH) was determined as an average value of $\Delta EC/\Delta pH$ in Table 5.

Although the present invention has been described in detail using specific embodiments, it will be apparent to those skilled in the art that various modifications are possible without departing from the spirit and scope of the invention.

This application is based on Japanese Patent Application No. 2017-014354 filed on Jan. 30, 2017, which is incorporated by reference in its entirety.

REFERENCE SIGNS LIST 3, 7: Electrical conductivity meter
4: Alkali adding device
5: Static mixer
8, 9: RO device

The invention claimed is:

1. A method for controlling a pH to a neutral range by adding an alkali or an acid to decarbonated water, comprising:
controlling an amount of the alkali or the acid added using an electrical conductivity meter,
a step of measuring the pH and electrical conductivity $EC_1$ [mS/m] of the decarbonated water;
a step of calculating electrical conductivity $EC_2$ [mS/m] of the water after the addition of the alkali or the acid according to the following formula; and
a step of adding the alkali or the acid so that the electrical conductivity after the addition of the alkali or the acid is the calculated $EC_2$ [mS/m]:

Electrical conductivity $EC_2$ [mS/m]=Electrical conductivity $EC_1$ [mS/m]+($\Delta EC/\Delta pH$) [mS/m]× (Target pH–pH of decarbonated water), wherein ($\Delta EC/\Delta pH$) is a ratio of an electrical conductivity relative to pH.

2. The method for controlling a pH according to claim 1, wherein the decarbonated water is water obtained by decarbonating industrial water or groundwater so that the concentration of carbonic acid is 10 ppm or less.

3. The method for controlling a pH according to claim 1, further comprising a step of producing pure water by RO treatment of the decarbonated water with a pH adjusted to 6 to 8 by the pH control.

4. The method for controlling a pH according to claim 1, wherein $\Delta EC/\Delta pH$ of the decarbonated water is experimentally determined in advance.

* * * * *